(12) United States Patent
Stephan

(10) Patent No.: US 6,476,732 B1
(45) Date of Patent: Nov. 5, 2002

(54) PASSIVE AUTOMATIC DOOR OPENER

(75) Inventor: Craig Hammann Stephan, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,591

(22) Filed: May 10, 2000

(51) Int. Cl.[7] .............................................. G08G 1/123
(52) U.S. Cl. ..................... 340/988; 340/989; 340/545.1
(58) Field of Search .................................. 340/988, 994, 340/825.69, 545.1, 933, 825.49, 435, 436, 903, 935, 989; 701/118

(56) References Cited

U.S. PATENT DOCUMENTS

| | | | |
|---|---|---|---|
| 5,127,486 A | * 7/1992 | Yardley et al. .............. | 180/168 |
| 5,613,216 A | 3/1997 | Galler ......................... | 455/66 |
| 5,640,139 A | 6/1997 | Egeberg ...................... | 340/426 |
| 5,657,007 A | 8/1997 | Anderson et al. ........... | 340/904 |
| 5,808,565 A | 9/1998 | Matta et al. ................. | 340/994 |
| 5,990,828 A | * 11/1999 | King ........................... | 342/359 |
| 6,002,332 A | * 12/1999 | King ......................... | 340/545.1 |
| 6,271,765 B1 | * 8/2001 | King et al. ............. | 340/825.69 |

* cited by examiner

Primary Examiner—Van Trieu
(74) Attorney, Agent, or Firm—Karl A. Vick

(57) ABSTRACT

A passive automatic overhead door system (10) which automatically activates a remote door operating device (17) through communication with a global positioning system (18). A vehicle (12) equipped with a GPS receiver (14) and a GPS controller (16) is capable of communicating information to automatically activate a remote door operating device (17) based on predefined vehicle locations and predefined travel directions stored in the GPS controller (16). After programming the GPS controller (16) through a user interface (19) located on board the vehicle (12), there is no further action required from a vehicle's operator in order to activate the remote door operating device (17).

2 Claims, 1 Drawing Sheet

is moving in the stored direction and reaches the stored location, based upon information received from the GPS

PASSIVE AUTOMATIC DOOR OPENER

TECHNICAL FIELD

The present invention relates generally to an automatic door opener, and more particularly to passive automatic control of an overhead door.

BACKGROUND OF THE INVENTION

In the prior art it has been necessary for a vehicle's operator to manually control a remote device that opens and closes an overhead door. There are situations when it is either not practical, or not possible for an operator, i.e. one who is disabled, to activate a remote device in order to open or close an overhead door. In addition, it is a common problem for an operator to drive away from an overhead door, inadvertently failing to activate the remote device to close the door. This may compromise the security of the building attached to the door.

In the luxury automotive market, there is a need for features that not only save the vehicle operator effort, but also reflect the advanced technology available to the automotive industry. Outside of the luxury car market, there are also applications in which it is necessary, or convenient, to have an overhead door automatically open and close for handling deliveries, routing traffic, and a variety of other applications.

SUMMARY OF THE INVENTION

It is an object of the present invention to provide a passive, automatic overhead-door operating system. It is another object of the present invention to eliminate the need for a vehicle's operator to activate a remote device in order to control the opening or closing of an overhead door.

It is a further object of the present invention to improve the security of a building, or area, that is accessed by an overhead door or gate mechanism.

In carrying out the above objects and other objects and features of the present invention, a method and apparatus are provided to automatically open and close an overhead door as a predetermined vehicle approaches or departs a predetermined vicinity of the overhead door. In the present invention, after the initial programming, there is no action needed by the vehicle operator in order to activate the remote operation of the overhead door.

The present invention works in conjunction with a global positioning system (GPS) and a vehicle equipped with a GPS receiver and a GPS controller. The GPS controller has a user interface that allows the vehicle operator to preset the control of the remote overhead-door opener in accordance with several predetermined vehicle locations in order to customize the operation of the automatic door opener. In addition, an override feature is available to allow the vehicle operator to prevent the door from opening or closing if it is so desired as well as operating the overhead door when the vehicle is away from the predetermined locations.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

The present invention may be readily adapted to a wide variety of applications in which an overhead door, or gate mechanism, is to be activated upon approach or retreat of a vehicle. For purposes of illustrating the invention, a passenger vehicle that approaches and retreats from a garage having an overhead door and a remote overhead-door opener will be used. However, it should be noted that the specific embodiments described herein are for example purposes only. One of ordinary skill in the art is capable of performing modifications that apply the present invention to a wide variety of applications, without departing from the scope of the invention described and claimed herein. For example, the present invention can be applied to a commercial garage for a delivery service, or in an application in which the flow of traffic is controlled by an overhead door or automatic gate mechanism, i.e. a rental car garage, a parking lot, etc.

Figure 1:
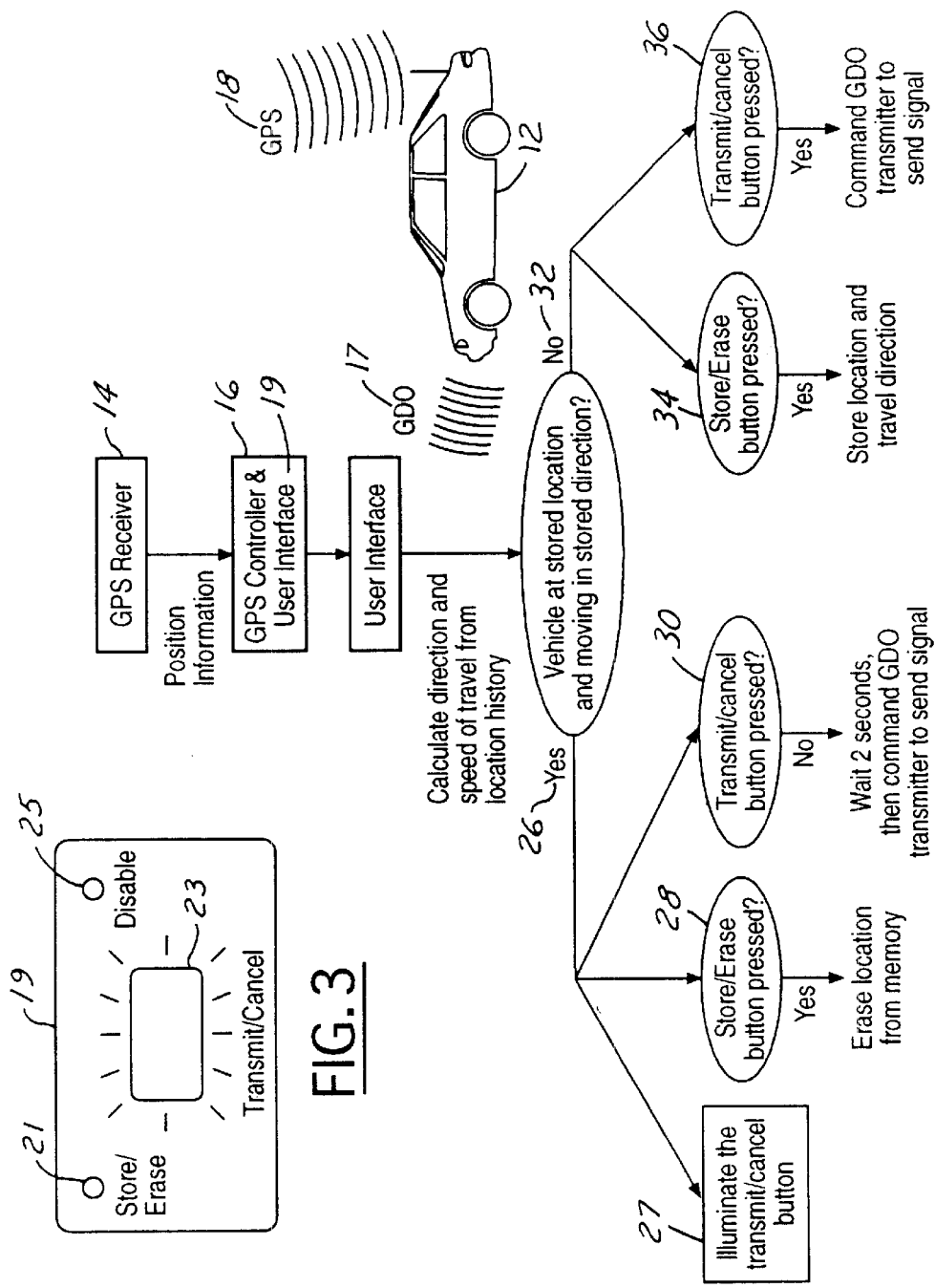
FIG. 1 is a functional diagram of a passive automatic overhead-door control system of the present invention.
Figure 3:
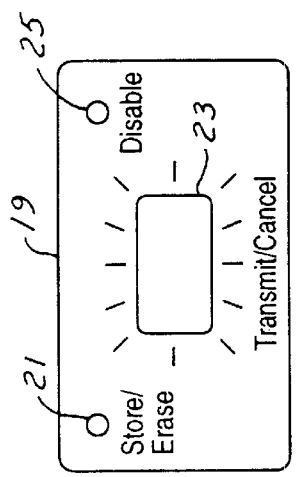
FIG. 3 is an illustration of a typical user interface

FIG. 1 is a block diagram of one embodiment of the system 10 of the present invention. A vehicle 12 is equipped with a receiver 14 and a controller 16 for a global positioning system (GPS) 18. In the present invention, the controller 16 has a user interface 19 that allows a vehicle operator to customize the operation of the automatic garage door opener system of the present invention. For example, FIG. 3 is an illustration of a typical user interface 19. The user interface 19 may have a "Store/Erase" button 21, a "Transmit/Cancel" button 23, and a "Disable" button 25 that, when activated at predetermined steps during the system's operation will set the operation or override the operation of the system 10. It should be noted that there are a multitude of similar schemes that can be used to accomplish similar results according to the present invention that are too numerous to mention herein. Therefore, the embodiments described herein are intended for example purposes only.

Referring again to FIG. 1, the controller 16 is capable of storing a plurality of locations and travel directions that are associated with the desired operation of an overhead garage door, according to the demands of the vehicle's operator. According to the present invention, it is possible to program the controller 16 with a location that automatically activates operation of a remote overhead-door opener, or garage door opener (GDO) 17 when the vehicle reaches the pre-set location. To program the controller, the vehicle operator merely drives the vehicle in the intended direction, and when the vehicle is at the desired location, the operator pushes the "Store/Erase" button. For example, to set the opening of the door, the "Store/Erase" button is pressed when the vehicle is approaching the garage and is at a desired distance from the garage. To set the closing of the door, the "Store/Erase" button is pressed when the vehicle is driving away from the garage door and is at a desired distance from the garage. In any event, the controller 16 stores the vehicle's location and travel direction in memory. Thereafter, whenever the vehicle is moving in the stored direction and reaches the stored location, based upon information received from the GPS receiver 14, the controller 16 will automatically activate the remote overhead door opener 17, without any input from the vehicle operator.

Figure 2:
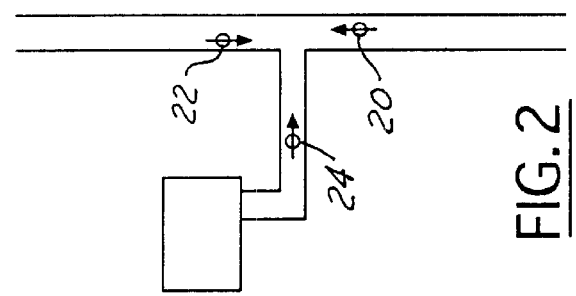
FIG. 2 is an example of typical locations and travel directions that may be programmed into the system of the present invention.

FIG. 2 shows some example locations and travel directions that may be set to activate the garage door. For example location 20 having a travel direction indicated by the arrow, and location 22 having a travel direction indicated by the arrow may be set to activate the opening of the garage door. Therefore, when the vehicle is approaching the garage in either direction, the garage door opener is activated and the door will automatically open. Location 24 having a travel direction indicated by the arrow may be set in the controller to activate the closing of the garage door. In this example, the door will automatically close as the vehicle departs from the garage.

Referring again to FIG. 1, an example of the function of the system will be described. As discussed above, the GPS receiver 14 receives the vehicle's position information from the GPS system 18 and transmits it to the GPS controller 16. The GPS controller 16 is used to calculate the direction and speed of travel of the vehicle. The controller 16 determines if and when a vehicle is within a predetermined distance of a stored location and is moving in a stored direction in order to determine if the garage door opener 17 should be activated.

In the case where the vehicle 12 is at a stored location and is traveling in a stored direction 26, the system 10 makes it possible to automatically operate the garage door opener 17, erase a stored memory location 28, and/or override the door's automatic operation 30. If no action is taken, the overhead door is automatically activated when the vehicle reaches a preset location while traveling in the preset direction. Should it be desired to erase a location and travel direction from memory, the vehicle's operator need only push the "Store/Erase" button located on the user interface 19 at a time when the vehicle is at a stored location and traveling in a stored direction. The location and travel direction will be erased from the controller 16 memory and the door opener 17 will not be activated for that location and travel direction.

To prevent accidental reprogramming, any of several well-known procedures might be used. For example, it is possible to require the "Transmit/Cancel" button be held down while pushing the "Store/Erase" button. Also, a simple means could be provided to allow all programmed locations to e erased at once, such as by pressing the "Store/Erase" button twice.

The override feature 30 will allow the vehicle's operator to avoid the automatic operation of the door opener 17. In one embodiment of the present invention, the "Transmit/Cancel" button is illuminated 27 for a predetermined period of time, i.e. two seconds, before the door is activated. In this embodiment, the time delay allows the vehicle operator the opportunity to override the action of the garage door, if for some reason the operator does not want the action to occur. Merely pushing the "Transmit/Cancel" button, located on the user interface 19, while it is illuminated, will prevent the GPS controller 18 from activating the garage door opener 17. If the vehicle operator takes no action, the door will automatically open or close, depending on the information stored in the controller 16.

In the case where the vehicle is not at a stored location, and/or it is not traveling in a stored direction 32, the "Store/Erase" button is used to set 34 a location and direction in the controller's memory. Also, the door's operation can be overridden 36 to open or close the garage door through manual activation of the door opener 17. For example, if the "Transmit/Cancel" button is pressed at a time when the vehicle is not at a stored location and/or is not traveling in a stored direction, the door opener 17 will be activated.

In another embodiment of the present invention, additional protection against unwanted door activity is provided. The controller 16 can be programmed with the capability of verifying the programmed location and travel direction. Therefore, when the vehicle enters a programmed location, the controller verifies the vehicle is moving at a predetermined minimum speed and was previously a predetermined minimum distance from the garage door before activating the door's operation.

It should be noted that in order to be compatible with existing garage door opener technology, the same signal is transmitted for "Open" and "Close", the effect being to reverse the state of the door, whatever that state is when the signal is received. For new installations, it may be desirable to have separate coded signals for "Open" and "Close" to ensure, for example, that an already open door is not closed by the signal from an approaching vehicle if the driver fails to cancel the command.

The invention covers all alternatives, modifications, and equivalents, as may be included within the spirit and scope of the appended claims.

What is claimed is:

1. An automatic door opener activation system for use with a global positioning system (GPS) and a door equipped with a remote door opener system, said automatic door opener activation system comprising:
   a GPS receiver located on a vehicle and in communication with the GPS to receive vehicle location and travel direction information from the GPS;
   a GPS controller located on the vehicle to determine when the vehicle location and direction match at least one predetermined vehicle location and at least one predetermined travel direction preset in the controller to activate the remote door opener system;
   a user interface located on the vehicle for programming the GPS controller;
   means for overriding the activation of the remote door opener system having a predetermined time delay for said activation of the remote door opener system.

2. A method for automatically activating the operation of a remote overhead-door opener, said method being for a vehicle having a controller having predetermined vehicle location and direction information stored therein and a receiver in communication with a global positioning system, said method comprising the steps of:
   determining when the vehicle is at a predetermined vehicle location and the vehicle is traveling in a predetermined direction based on information received from the global positioning system;
   activating the remote overhead-door opener; and
   overriding the activation of the remote over-head door opener by introducing a time delay before activating the remote over-head door opener.

* * * * *